United States Patent [19]

Nakano

[11] Patent Number: 5,042,255

[45] Date of Patent: Aug. 27, 1991

[54] MASTER CYLINDER

[75] Inventor: Toshihiro Nakano, Chiryu, Japan

[73] Assignee: Aisin Seiki Kabushiki Kaisha, Kariya, Japan

[21] Appl. No.: 359,340

[22] Filed: May 31, 1989

[30] Foreign Application Priority Data

May 31, 1988 [JP] Japan .................................. 63-072935

[51] Int. Cl.⁵ .............................................. B60T 11/28
[52] U.S. Cl. ........................................ 60/589; 60/562
[58] Field of Search ................... 60/589, 562, 588, 585

[56] References Cited

U.S. PATENT DOCUMENTS 4,707,989  11/1987  Nakamura et al. ..................... 60/589
4,741,161   5/1988  Belart et al. ....................... 60/589 X
4,773,224   9/1988  Sakamoto et al. .................... 60/589

Primary Examiner—William E. Wayner
Attorney, Agent, or Firm—Burns, Doane, Swecker & Mathis

[57] ABSTRACT

A master cylinder is provided with an arrangement which prevents a valve from being held in a closed and inoperative position by residual pressure in the system. By preventing the valve from being held in the closed position, residual pressure can be released from the cylinder and prevent brake fluid pressure from disabling the brake system.

5 Claims, 2 Drawing Sheets

MASTER CYLINDER

BACKGROUND OF THE INVENTION

1. Field of the Invention

The present invention relates to a master cylinder which is used with a hydraulic brake or clutch system for an automobile. More particularly, the present invention relates to a master cylinder of the portless type which has a piston provided with a valve mechanism for establishing or fluid interrupting communication between a pressure chamber and a reservoir.

2. Description of the Related Art

A conventional master cylinder of the portless type is disclosed, for example, in U.S. Pat. No. 4,707,989. Therein, a piston is fitted slidably in a liquid-tight fashion in a bore of a cylinder body and defining therein a pressure chamber normally in communication with fluid conduits leading to wheel cylinders and a supply chamber normally in communication with a reservoir. The piston has a recess at one end thereof facing the pressure chamber. A valve seat is provided at a bottom of the recess. A valve member is provided in the recess and is movable axially of the piston away from, or onto, contact with the valve seat for establishing or interrupting communication between the pressure chamber and the supply chamber (the reservoir). A first compression spring is provided in the recess for urging the valve member toward the valve seat. A supporting member is connected to the valve member and positioned at the bottom of the pressure chamber. A retainer is fitted on the end of the piston. A connecting rod extends through the supporting member and the retainer and is movable by a predetermined distance axially of the piston. A second compression spring is disposed between the supporting member and the retainer for urging them to move the valve member away from the valve seat by a predetermined distance. The retainer is movable in normal operation axially by a certain distance relative to the piston so as to increase the distance between the valve member and the valve seat and to allow release of any residual fluid in the pressure chamber. The supporting member is fixed to the cylinder body.

In the master cylinder of the portless type, if the brake pedal is again depressed before it returns to its original position, hydraulic fluid causes a cup member to flex and permits hydraulic fluid to flow into the pressure chamber. This fluid produces in the pressure chamber a residual pressure which prevents smooth restoration of the brake pedal to its original position. Further, it is often the case that the residual pressure produced in the pressure chamber as hereinbefore described may cause the valve member to be stretched elastically and stay at rest on the valve seat, even when the piston is brought back to the inoperative position. If the valve member remains closed, the residual pressure cannot be released from the pressure chamber, and disables the brake system completely. This problem may be solved if there is a greater distance between the valve member and the valve seat when the piston is in its inoperative position. This solution, however, results in an increased idle stroke of the piston and therefore of the brake pedal.

One way of overcoming this problem in the above master cylinder has been developed. Since the piston slides relative to the retainer in the direction which the valve member is separated from the valve seat by the residual pressure when the piston is brought back to its inoperative position, the valve member is separated from the valve seat more than the predetermined distance. Therefore, the above problem may be overcome without increasing the idle stroke of the brake pedal as mentioned above.

In the prior master cylinder, however, it is often the case that the piston is caused to move further due to the residual pressure after separating the valve member from the valve seat. If the piston slides more than a certain distance relative to the retainer, large stresses are applied to the retainer, the connecting rod and the supporting member, respectively, and may cause damage to these parts. Furthermore, when these parts are damaged and the piston slides an increased distance toward the supply chamber, a primary cup member passes a supply port providing fluid communication between the supply chamber and the reservoir. As a result, the primary cup member is damaged and braking operation becomes an impossibility due to the loss of the sealing function of the pressure chamber due to the primary cup. Furthermore, an inner surface of the bore of the cylinder body is damaged so as to prevent reuse of the cylinder body. These above drawbacks are not only caused by the residual pressure problem but also are caused when an anti-skid control device or a traction control device of the type which causes hydraulic fluid to flow back from the wheel cylinders to the pressure chamber in the master cylinder through a pump when the wheels are locked or slipping.

The above drawbacks may be solved if the retainer, the connecting rod and the supporting member are increased in strength by increasing size, strength of materials, etc. This solution, however, results in an increased manufacturing cost of the master cylinder and increased weight of the master cylinder.

SUMMARY OF THE INVENTION

It is, therefore, an object of the present invention to prevent the valve member being held in a closed position by the residual pressure in the inoperative position of the piston without increasing the manufacturing cost, the weight of the master cylinder and the length of the idle stroke of the brake pedal.

It is another object of the present invention to improve the manufacturing process, the installing process and the removal of the master cylinder.

It is further object of the present invention to provide an improved master cylinder which includes a cylinder body having an axial bore, a piston fitted slidably in a liquid-tight fashion in the bore of the cylinder body and defining therein a pressure chamber normally in communication with a fluid conduit leading to wheel cylinders and a supply chamber normally in communication with the reservoir. The piston has at one end thereof a recess facing the pressure chamber and has a bottom defining a valve seat, a valve member is fitted in the recess and movable axially of the piston away from, or into, contact with the valve seat for establishing or interrupting communication between the pressure chamber and the supply chamber. A retainer is fitted about one end of the piston and a first compression spring is held in the recess by the retainer for urging the valve member toward the valve seat. A supporting member is provided in the bore on the opposite side of the pressure chamber from the piston, a connecting rod is connected to the valve member and extends through the retainer and the supporting member and is movable axially of the piston. A second compression spring is provided between the retainer and the supporting member for urging them away from each other to cause the connecting rod to engage the retainer and the supporting member to thereby move the valve member away from the valve seat. The supporting member is fixed to the cylinder body so as to be movable a first predetermined distance in an axial direction of the bore, the retainer being movably fitted about the piston by a third predetermined distance relative to the piston so as to increase the distance between the valve member and the valve seat and to allow release of any residual fluid in the pressure chamber. An engaging member limits movement distance of the piston from its inoperative position to the supply chamber side to a second predetermined distance which is larger than the first predetermined distance and which is smaller than the total between the first and the second predetermined distance.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A master cylinder in accordance with preferred embodiments of the present invention is described with reference to the drawings.

Figure 1:
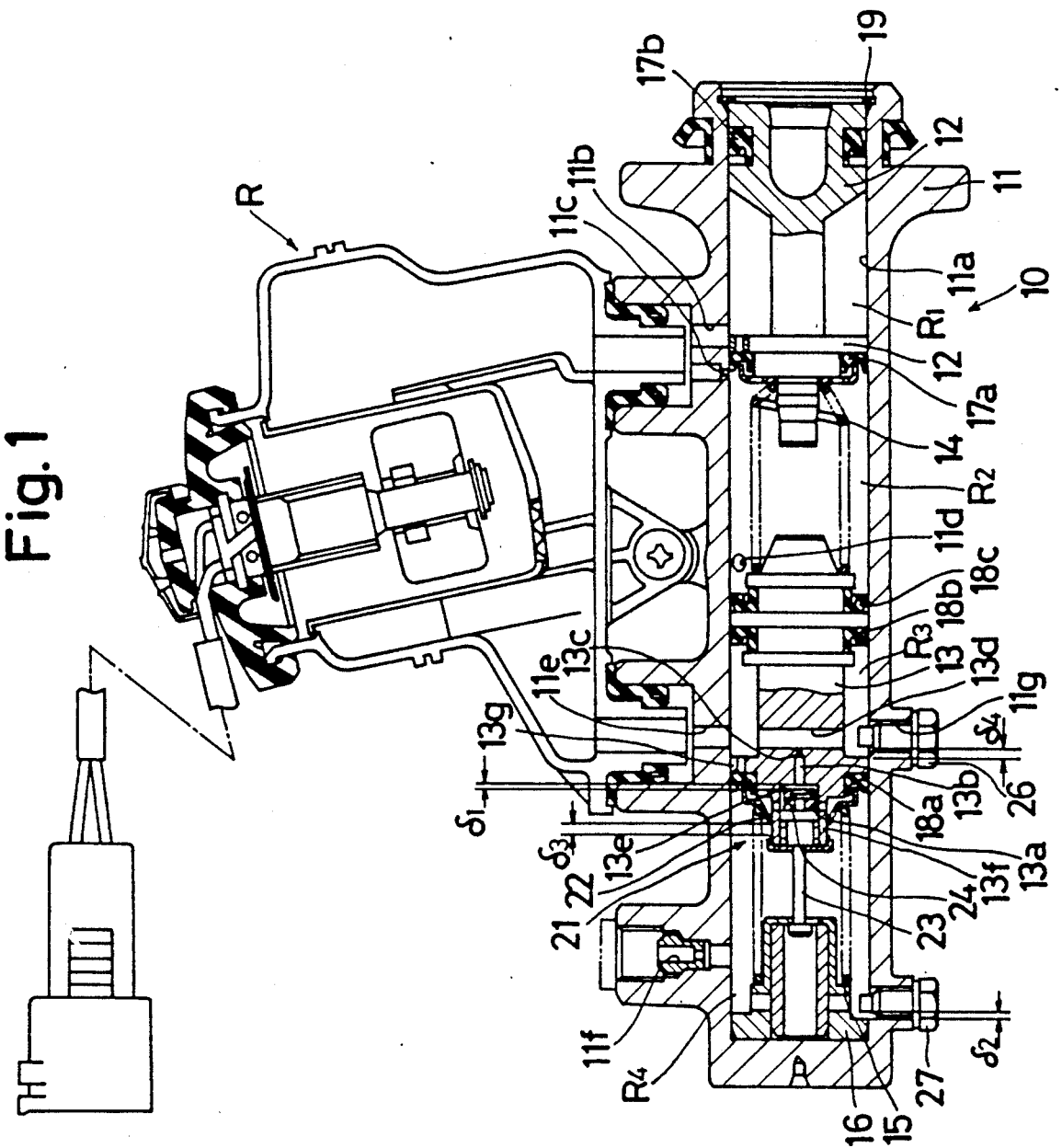
FIG. 1 is a section view of a master cylinder in accordance with the present invention.

Referring to FIG. 1, there is shown a tandem master cylinder embodying the present invention and used with a hydraulic brake system for an automobile. The master cylinder includes a cylinder body 11, a primary piston 12, a secondary piston 13, a pair of return springs 14 and 15, a supporting member or holder 16, and a valve mechanism 21.

The cylinder body 11 has an axial bore 11a in which the holder 16, each piston 12 and 13, each return spring 14 and 15 and so on are disposed with the brake fluid. A primary cup 17a and a secondary cup 17b are fitted about the primary piston 12 adjacent to its opposite ends, respectively, to position it axially slidable in a liquid-tight fashion. A primary cup 18a, a secondary cup 18b and a pressure cup 18c are fitted about the secondary piston 13 to position it axially and slidably in a liquid-tight fashion. The return springs 14 and 15 are interposed between both pistons 12 and 13 and between a retainer 22 and the holder 16, respectively. The primary piston 12 is urged in the right direction by the return spring 14 as viewed in FIG. 1 and is positioned at its inoperative position as shown in FIG. 1 by contact with a circlip 19 which is tightly received in an opening end of the bore 11a. The secondary piston 13 is urged toward the right direction as shown in FIG. 1 until a connecting rod 23 engages with the holder 16 by the return spring 15 having a larger spring force than the return spring 14 and is positioned at its inoperative position as shown in FIG. 1. Thereby, a primary supply chamber R1 which is normally communicated with a reservoir R via a communicating opening 11b is defined in the bore 11a between the primary and secondary cups 17a and 17b. The primary and secondary pistons 12 and 13 define a primary pressure chamber R2 which is normally communicated with a reservoir R via a compensating port 11c and with the one of the fluid conduits leading to the wheel cylinders via an outlet port 11d therebetween in the bore 11a. A secondary supply chamber R3 which is normally communicated with the reservoir R via a supply port 11e is defined between the primary and secondary cups 18a and 18b in the bore 11a. The secondary piston 13 and the bottom of the bore 11a define a secondary pressure chamber R4 therebetween in the bore 11a. The secondary pressure chamber R4 is communicated with the secondary supply chamber R3 via the valve mechanism 21 and is normally communicated with the other fluid conduits leading to the wheel cylinders via an outlet port 11f.

The secondary piston 13 has a recess 13a at its end facing the secondary pressure chamber R4 and an axial opening 13b and an orifice 13c which are coaxial with the recess 13a. Further, the secondary piston 13 has a passage 13d having both ends opening into the secondary supply chamber R3 and which is in communication with one end of the orifice 13c. In the recess 13a, a valve member 24 and a compression spring 25 of the valve mechanism 21 are interposed.

The valve mechanism 21 comprises a connecting rod 23 installed at one end facing of the secondary pressure chamber R4 by the retainer 22. The valve member 24 is fixed to the enlarged end of the connecting rod 23 and the compression spring 25 is interposed between the retainer 22 and the connecting rod 23 and urges the valve member 24 to separate from a valve seat 13e *formed at a bottom of the recess 13a*. The valve member 24 is made of rubber and faces the valve seat 13e. Valve member 24 is axially movable away from or into contact with the valve seat 13e for establishing or interrupting fluid communication between the secondary pressure chamber R4 and the secondary supply chamber R3. The valve member 24 is separated a predetermined distance $\delta 1$ from the valve seat 13e by the compression spring 25 at the illustrated inoperative position of the secondary piston 13.

The connecting rod 23 is axially and movably disposed in the recess 13a at the enlarged end portion and removal therefrom is prevented by the retainer 22. The connecting rod 23 has another enlarged end which is positioned within the holder 16. The connecting rod 23 extends movably through the holder 16 and the retainer 22 and the enlarged opposite ends of the connecting rod 23 are engageable with the inner surface of the holder 16 and the retainer 22, respectively. The holder 16 is axially movable by a first predetermined distance $\delta 2$ ($0 < \delta 2 < 0.8$) relative to the bottom of the cylinder body 11 by a stopper bolt 27 which is threaded into the cylinder body 11.

The retainer 22 has a plurality of protrusions which are slidably guided on a circular groove 13f formed on the end facing of the secondary pressure chamber R4 side of the secondary piston 13. The retainer 22 is axially movable by a second predetermined distance $\delta 4$ relative to the secondary piston 13. The retainer 22 extends to a land portion 13g of the secondary piston 13 and prevents removal of the primary cup 18a from the secondary piston 13. The return spring 15 is interposed between the retainer 22 and the holder 16.

The return spring 15 comprises a compression spring which urges the secondary piston 13 away from the holder 16 so as to cause the opposite ends of the connecting rod 23 to engage the holder 16 and the retainer 22, respectively. Thus, the valve member 24 is separated by a predetermined distance from the valve seat 13e by overcoming the force of the compression spring 25 for establishing communication between the secondary pressure chamber R4 and the secondary supply chamber R3. If the secondary piston 13 is moved more than the predetermined distance by overcoming the force of the return spring 15, the connecting rod 23 is axially moved and the compression spring 25 brings the valve member 24 into contact with the valve seat 13e for interrupting communication between the secondary pressure chamber R4 and the secondary supply chamber R3. The secondary piston 13 is limited in its movement by an engaging member or stopper bolt 26 which threadedly passed through the cylinder body. Thereby, the secondary piston 13 is axially movable by a second predetermined distance $\delta 4$ from its inoperative position toward the primary piston 12. The movement distance of the secondary piston 13 is limited by the engagement between the stopper bolt 26 and the land 13g of the pressure chamber side of the secondary piston 13. An installation opening 11g for installing the stopper bolt 26 is coaxial with the supply port 11e. The relationship among the first predetermined distance $\delta 2$, the third predetermined distance $\delta 3$ and the second predetermined distance $\delta 4$ is set so as to satisfy the following formula, $\delta 2 < \delta 4$ and $\delta 2 < \delta 3$.

The actuating rod of a brake booster (not shown) is connected to the rear end of the primary piston 12. If the brake pedal is depressed, the primary piston 12 is moved to the left as viewed in FIG. 1 by overcoming the force of the return spring 14. The primary cup 17a of the primary piston 12 passes on the compensating port 11c and the fluid communication between the primary supply chamber R1 and the primary pressure chamber R2 is interrupted. As a result, the fluid in the primary pressure chamber R2 may have an elevated pressure. The elevated fluid pressure is transmitted to one of the fluid conduits via the outlet port 11d and simultaneously moves the secondary piston 13 to the left by overcoming the force of the return spring 15. As a result, if the secondary piston 13 is moved more than the predetermined distance $\delta 1$, the valve member 24 rests on the valve seat 13e to interrupt communication between the secondary pressure chamber R4 and the secondary supply chamber R3 so that the fluid in the secondary pressure chamber R4 may have an elevated pressure.

The elevated fluid pressure is transmitted to the other of the fluid conduits via the outlet port 11f. At this time, since the fluid communication between the primary pressure chamber R2 and the reservoir R is throttled by the compensating port 11c, the evacuation of the fluid from the primary pressure chamber R2 to the reservoir R is restrained before passing the primary cup 17a on the compensating port 11c and the fluid pressure in the primary pressure chamber R2 is rapidly elevated. Since the fluid communication between the secondary pressure chamber R4 and the secondary supply chamber R3 is throttled by the orifice 13c, the fluid is evacuated from the secondary pressure chamber R4 to the secondary supply chamber R3 before the seating of the valve member 24 onto the valve seat 13e. Accordingly, the fluid pressure in the secondary pressure chamber R4 is rapidly elevated.

If depression of the brake pedal is discontinued, the return springs 14 and 15 return the pistons 12 and 13 to their respective inoperative positions. The pressure chambers R2 and R4 are communicated again with the supply chambers R1 and R3, respectively, and the pressure of the fluid in each of the pressure chambers R2 and R4 becomes equal to that of the fluid in the reservoir R. At this time, if negative pressure is generated in the pressure chambers R2 and R4, the fluid in the supply chambers R1 and R3 causes the primary cups 17a and 18a to flex and the fluid flows into the pressure chambers R2 and R4 via small holes formed on the lands 12a and 13g.

If the brake pedal is again depressed before it returns to its original position, hydraulic fluid in the supply chambers R1 and R3 causes the cups 17a and 18a to flex and the fluid flows into the pressure chambers R2 and R4 via the small holes. As a result, the fluid pressure in the pressure chambers R2 and R4 is increased and this increased fluid pressure is applied to the fluid conduits.

When the depression of the brake pedal is released in either of the situations mentioned above, residual pressure exists in the pressure chambers R3 and R4 even though the pistons 12 and 13 have returned to the respective inoperative position. As a result, the valve member 24 is elastically stretched by the residual pressure and stays at rest on the valve seat 13e.

In the above condition, the embodiment operates as follows. The secondary piston 13 is moved the first predetermined distance $\delta 2$ toward the secondary supply chamber R3 with the retainer 22, the connecting rod 23 and the holder 16 until the holder 16 engaged with the stopper bolt 27.

As a result, the volume of the secondary pressure chamber R is increased and the residual pressure decreases. When the holder 16 engages with the stopper bolt 27 and the movement of the holder 16 is stopped, the secondary piston 13 further individually moves toward the secondary supply chamber R3 relative to the retainer 22 which is engaged with the holder 16 via the connecting rod 23. Thereby, the distance between the valve member 24 and the valve seat 13e is greater than the predetermined distance $\delta 1$ and the valve member 24 is positively separated from the valve seat 13e. Accordingly, the valve member 24 is prevented from being held in the closed position by the residual pressure in the inoperative position of the secondary piston 13 without increasing the idle stroke of the brake pedal. After that, if the secondary piston 13 moves toward the secondary supply chamber R3, the movement of the secondary piston 13 is limited by the second predetermined distance $\delta 3$ by the stopper bolt 26 before the secondary piston 13 moves the third predetermined distance $\delta 4$ relative to the retainer 22. Accordingly, increased stress is not transmitted to the retainer 22, the connecting rod 23 and the holder 16. Therefore, it is not necessary to increase the manufacturing cost of the master cylinder and the weight of the master cylinder for ensuring the strength of these parts. Also, the above-mentioned operation of the stopper bolt 26 is operative with the anti-skid control device or the traction control device. Since the secondary piston 13 is engaged with the stopper bolt 26 at the land portion 13g, inclination tendency of the secondary piston 13 is restrained and smooth sliding movement of the secondary piston 13 and the connecting rod 23 is ensured. Further, in this embodiment, since the installation opening 11g for installing the stopper bolt 26 is coaxial with the supply port 11a, the installation opening 11g and the supply port 11e may be made or formed at the same time. Therefore, the manufacturing cost of the master cylinder is reduced and the installation or removal of the secondary piston 13, the retainer 22, the return spring 15, the connecting rod 23, the valve member 24, the compression spring 25 and the holder 16 can be achieved without removing the reservoir R from the cylinder body 11. The connecting rod 23 connects the secondary piston 13, the holder 16, the retainer 22, the valve member 24 and the compression spring 25 together to form a part of the unitary assembly. The base line of the distance between the primary cup 18a and the supply port 11e is the same as the base line of the distance between the stopper bolt 26 and the land portion 13g.

Figure 2:
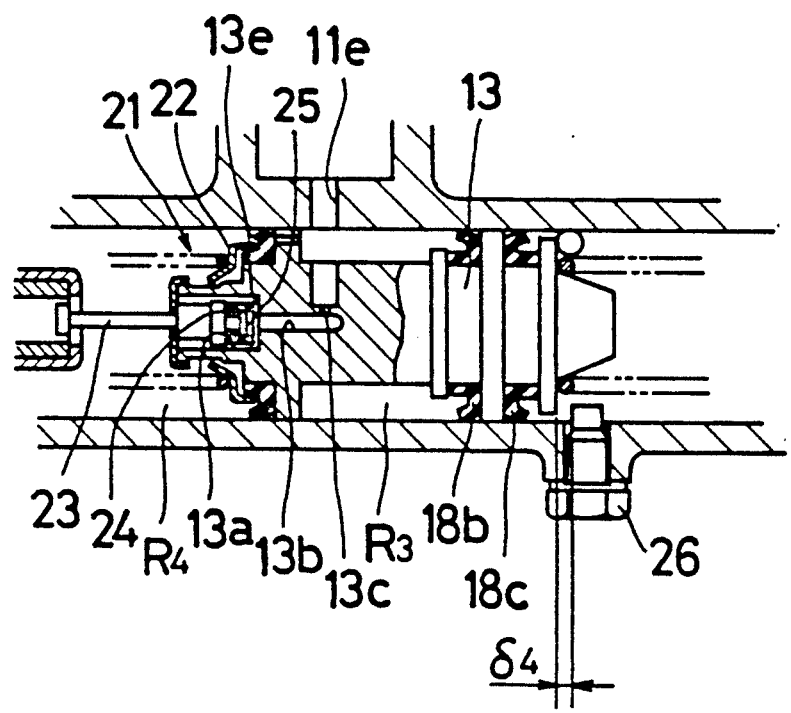
FIG. 2 is a partial sectional view of an illustration of a variation of a master cylinder in accordance with the present invention.

FIG. 2 shows a part of an illustration of a variation of the present invention. In this embodiment, the stopper bolt 26 is engaged with a flange portion 13h of the secondary piston 13 which faces toward the primary pressure chamber R2. The other structure or operational effect is as same as the embodiment shown in FIG. 1.

As mentioned above, the present invention makes it possible to prevent the valve member from being held at the closed position by the residual pressure when in the inoperative position of the piston without increasing the manufacturing cost, the weight of the master cylinder or the idle stroke of the brake pedal. Further, the present invention reduces the fitting distance between the piston and the retainer by the determination of the first predetermined distance and it is able to reduce the distance between the primary cup and the supply port by the determination of the second predetermined distance and thereby reduce the axial length of the master cylinder.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A master cylinder comprising:
a cylinder body having an axial bore,
at least one piston fitted slidably in a liquid tight manner in the bore of the a cylinder body and defining therein a pressure chamber normally in communication with a fluid conduit leading to wheel cylinders and a supply chamber normally in communication with a reservoir, the piston having at one end thereof a recess facing the pressure chamber and having a portion defining a valve seat,
a valve member received in the recess and removable axially of the piston into and out of contact with the valve seat for establishing and interrupting communication between the pressure chamber and the supply chamber;
a retainer received about the one end of the piston,
a first compression spring held in the recess by the retainer for urging the valve member toward the valve seat,
a supporting member provided in the bore on a side of the pressure chamber opposite from the piston,
a connecting rod connected to the valve member and extending through the retainer and the supporting member and movable in the axial direction of the piston,
a second compression spring provided between the retainer and the supporting member for urging the retainer and the supporting member away from each other to cause the connecting rod to engage the retainer and the supporting member to thereby move the valve member away from the valve seat, the supporting member fixed to the cylinder body so as to be movable by a first predetermined distance axially of the bore,
an engaging member limiting a movement distance of the piston from its inoperative position to the supply chamber side to a second predetermined distance which is larger than the first predetermined distance and which is smaller than the total between the first predetermined distance and a third predetermined distance, and
the retainer being movably fitted about the piston by a third predetermined distance relative to the piston so as to increase the distance between the valve member and the valve seat and to allow release of any residual fluid in the pressure chamber.

2. A master cylinder as recited in claim 1, wherein the piston, the valve member and the supporting member are connected by the connecting rod to constitute an unitary assembly.

3. A master cylinder as recited in claim 2, wherein the cylinder body has a supply port communicating between the supply chamber and the reservoir and an installation opening for installing the engaging member, the installation opening being coaxial with the supply port.

4. A master cylinder as recited in claim 3, wherein the engaging member is engaged with a land portion formed on the pressure chamber side of the piston.

5. A master cylinder as recited in claim 1, wherein the cylinder body has an orifice in communication between the supply chamber and the pressure chamber.

* * * * *